Sept. 7, 1926.
W. R. MacKENZIE
1,598,978
DIRECTION INDICATOR FOR VEHICLES
Filed Nov. 16, 1925
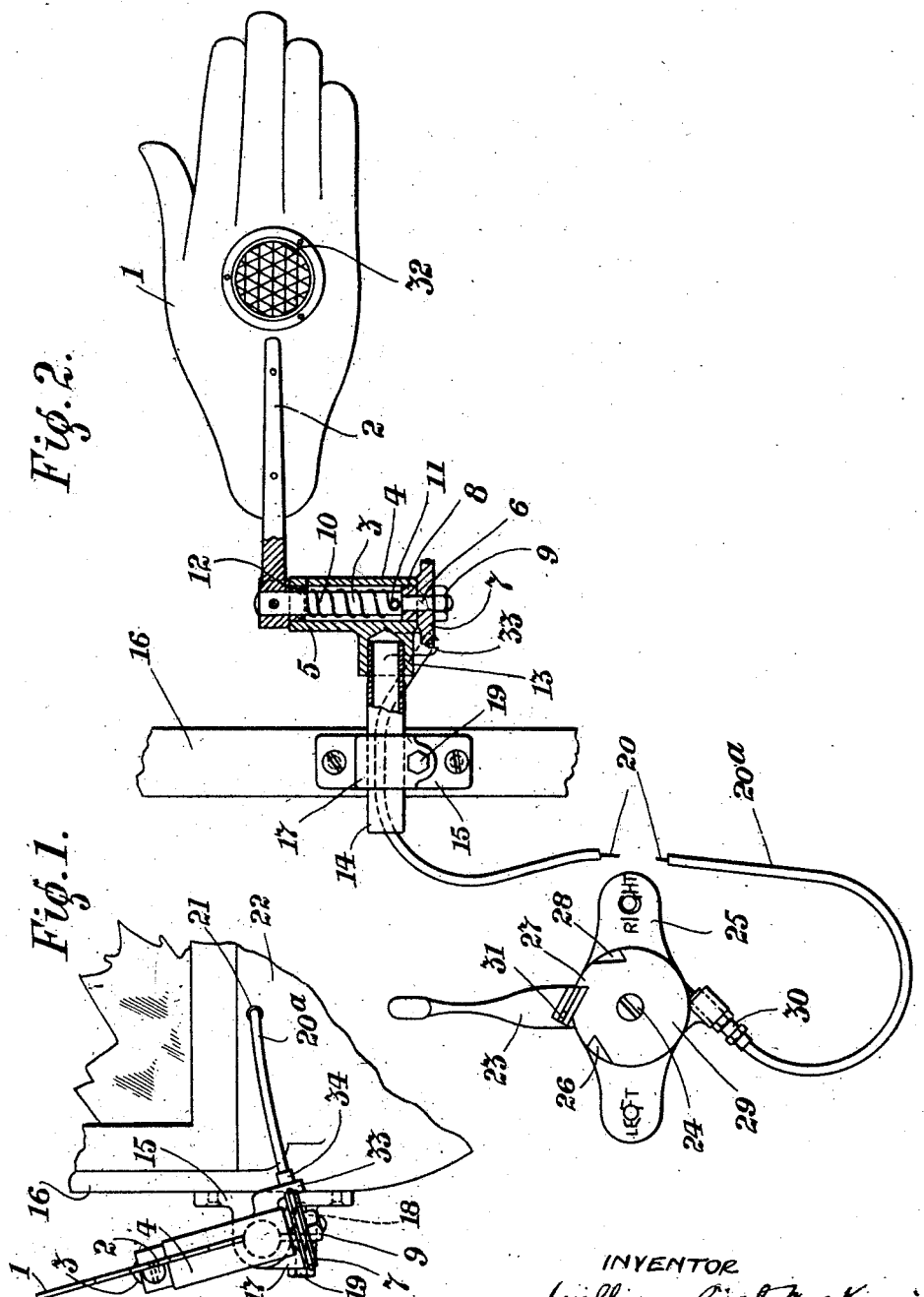
INVENTOR
William Rick MacKenzie
By John B. Brady,
attorney Patented Sept. 7, 1926.

1,598,978

UNITED STATES PATENT OFFICE.

WILLIAM RICH MacKENZIE, OF BELFAST, IRELAND.

DIRECTION INDICATOR FOR VEHICLES.

Application filed November 16, 1925, Serial No. 69,382, and in Great Britain October 2, 1925.

This invention relates to direction-indicating devices for vehicles.

According to the present invention I provide a direction-indicating device for vehicles, in which the indicating hand or the like tends constantly to be turned from its normal or forward indicating position into one of its other direction-indicating positions by spring pressure and is adapted to be turned to its other and opposite indicating position by means acting against the spring-pressure.

The device may comprise spring means tending constantly to turn the indicating hand or the like into one of its indicating positions, means, including a Bowden cable, being provided, for acting against said spring means so as to turn the indicating hand or the like into its other indicating positions. The indicating hand or the like may be connected to a turnable shaft arranged at the exterior of the vehicle and constantly urged in one direction, so that the indicating hand occupies one of its indicating positions, by a spring surrounding said shaft and secured at one end to a fixed member and at the other end to said shaft, the latter being adapted to be turned in the opposite direction by operating means arranged in the interior of the vehicle.

Preferably the operating means consists of an operating lever connected by means of a Bowden cable to a pulley secured to said shaft, and said lever may also be provided with a spring-stop and turnably arranged in a bracket having slots wherein said spring-stop is adapted to engage, to hold the indicating hand in the desired indicating position or in its normal 'forward' indicating position.

I prefer to construct and arrange the device so that it is adjustable towards and away from the vehicle and adjustable to one side or the other of a vertical plane, for the purpose of arranging the device clear of any other fitting on the vehicle, such as a horn or mirror.

A constructional form of my invention is illustrated, by way of example, in the annexed drawing, whereon:—

Figure 1 is a fragmentary view of the front part of a motor vehicle to which the indicating device is applied; and Figure 2 is a fragmentary side elevation, partly in section, corresponding to Fig. 1.

Referring to the drawing:—

The indicating hand 1 is formed from a flat plate of metal and is secured to one end of an arm 2 connected, at its other end, to the upper end of a shaft 3 rotatably mounted in a hollow bearing member 4. A boss 5 is formed on the underside of the arm 2 and is turnably arranged in the bore of the bearing member 4. The bottom end of the shaft 3 is reduced in diameter at 6, the reduced part being secured to a pulley 7 formed with a grooved periphery and having a boss 8 which is rotatably arranged in the bore of the bearing member 4, said pulley being prevented from moving axially along the shaft 3 by means of a nut 9 screwed on to the end of the part 6 of said shaft. A coil spring 10 is arranged around the exterior of the shaft 3 within the bearing member 4 and is secured at one end to the shaft by means of a screw 11 and at its other end 12 to the bearing member 4. The tendency of the spring 10 is to maintain the arm 2 and indicating hand 1 in one of their indicating positions at right angles to that which they are shown to be occupying in Figure 2.

The bearing member 4 is formed with a hollow boss 13, wherein one end of a tubular member 14 is screwed said member being carried in a bracket 15 secured to, and projecting laterally from, one side 16 of the frame of the wind-screen. The bracket 15 is split, as shown in Fig. 1, and the tubular member 14 is firmly held between the two parts 17 and 18 of the bracket by means of a screw 19, which passes through a hole in the part 17 and screws into the part 18, thus drawing the two parts closer together.

In order to operate the indicating hand 1 from the inside of the vehicle, one end of a Bowden cable 20, covered by a sheath 20ᵃ, is coiled around and secured to the grooved periphery of the pulley 7, said cable being passed through a hole 21 formed in the dashboard 22 of the car. The end of the sheath 20ᵃ proximate to the bearing member is provided with the usual adjusting device 34 screwed into a depending lug 33 on the boss 13, through which the cable passes. The other end of the cable 20 is secured to a hand-operating lever 23 which is rotatably arranged on a pin 24 screwed into a bracket 25 and supporting a disc 29 between which and the bracket 25 the lever 23 is turnable, the bracket 25 being secured to the dashboard of the vehicle in close proximity to the driver. The said lever is adapted to be turned from its vertical or normal position in which it is shown in Fig. 2 to the right or left thereof, whereupon a corresponding movement of the indicating hand 1 will take place as described hereafter. Slots 26, 27 and 28 are formed in the disc 29 and are adapted to be engaged by a spring-stop 31 provided on the lever 23. The end of the Bowden cable in the interior of the vehicle is provided with the usual adjusting device 30.

As previously mentioned, the coil spring 10, tends constantly to turn the shaft 3 in one direction so that the indicating hand 1 is at right angles to the position shown in Fig. 2. The two 'change of direction' positions of the hand are indicated by the words "Right" and "Left" marked on the bracket 25. When the operating lever is moved from its normal position to the position in which the stop 31 engages in the slot 26, the coil spring 10 is tightened round the shaft 3, so that when the lever is again returned to its normal position the unwinding of the spring turns the shaft 3 and the hand 1 back to their normal positions, in which the hand points straight ahead. The same action takes place when the lever 23 is moved from its normal position to the position in which the spring-stop 31 engages in the slot 28. When, however, said operating lever is moved so that the stop 31 is disengaged from the slot 28 and engages in the slot 27, the spring 10 is once more tensioned, the pulley 7 being turned by means of the Bowden cable which in the reverse movement of the shaft 3 has been wound on to said pulley. Similarly, if the lever 23 is moved from its normal position into the position in which the stop 31 engages in the slot 26 the Bowden cable is still further unwound from the pulley 7 and the spring 10 still further tensioned.

Owing to the fact that the tubular member 14 is mounted in the split-bearing bracket 15, the indicating hand can be adjusted towards or away from the vehicle by simply unscrewing the screw 19, whereupon the tubular member 14 can be slid axially, the split-bearing being tightened again by screwing up the screw 19. It will also be obvious that the bearing member 4 and the indicating hand 1 can be inclined to the vertical by turning the tubular member 14 relatively to the bracket 15. These adjustments are desirable for the purpose of arranging the indicating device clear of any other fittings on the vehicle, such as a horn or mirror.

A glass disc or the like 32 is provided on the back of the indicating hand 1 in order to indicate by night the direction in which the vehicle is to be turned by being illuminated by the lamps of a following or approaching vehicle.

It should be particularly noted that in addition to being adapted to give the usual turning signals the indicating hand can also be turned forwards and backwards by the lever 23 in order to give a signal indicating to an overtaking vehicle to pass.

The indicating device is very easy to manufacture and assemble and is particularly adapted for use on closed vehicles of the coach-built type or the type fitted with side curtains. The device is extremely easy to operate, and has the additional advantage that it does not comprise the multiplicity of component parts by which many known direction-indicating devices are characterized.

Having now fully described my invention, what I claim and desire to secure by Letters Patent is:—

1. A direction-indicating device for vehicles comprising, in combination, an indicating member, means for supporting the indicating member in such a manner as to be turnable about an axis adapted for angular and axial adjustment relative to a second axis which is in the same plane as the first, spring means adapted to exert a constant turning effort on the said indicating member in one direction about the said first axis so as to move the said member from its forward indicating position into one of its transverse indicating positions, and means for turning the member into its other and opposite transverse indicating position against the action of the spring means.

2. A direction-indicating device for vehicles comprising, in combination, a shaft, a bearing member wherein said shaft is turnably arranged, means whereby the said shaft and its bearing member are adapted for angular and axial adjustment relative to an axis in the same plane as the axis of the said shaft, an indicating member secured to said shaft, a spring adapted to exert a constant turning effort on the shaft in one direction, an operating lever, and means connecting said operating lever to said shaft.

3. A direction-indicating device for vehicles comprising, in combination, a shaft, a bearing member wherein said shaft is turnably arranged, a tubular member projecting laterally from the bearing member, and having its axis in the same plane as the axis of the said shaft, a split-bearing, mounted on the vehicle, wherein said laterally projecting member is arranged, an indicating member secured to said shaft, a coil spring surrounding the shaft within the bearing member and having one of its ends connected thereto, means for securing the other end of the spring to said shaft, a pulley secured to said shaft, an operating lever, and Bowden cable means for connecting the operating lever to the pulley.

4. A direction-indicating device for vehicles comprising, in combination, an indicating hand, a shaft, an arm secured at one end to said shaft and at the other end to said hand, a bearing member wherein said shaft is turnably arranged, a tubular member projecting laterally from said member, and having its axis in the same plane as the axis of the said shaft, a split-bearing, secured to the vehicle, wherein said tubular member is arranged, a coil spring surrounding said shaft within the bearing member and having one end secured thereto, means for securing the other end of the spring to said shaft, a pulley secured to the shaft, an operating lever turnably arranged in the interior of the vehicle, and a Bowden cable for connecting said lever and pulley.

5. A direction-indicating device for vehicles comprising, in combination, an indicating hand, a shaft, an arm secured at one end to said shaft and at the other end to said hand, a bearing member wherein said shaft is turnably arranged, a tubular member projecting laterally from said member, and having its axis in the same plane as the axis of the said shaft, a split-bearing, secured to the vehicle, wherein said tubular member is arranged, a coil spring surrounding said shaft within the bearing member and having one end secured thereto, means for securing the other end of the spring to said shaft, a bracket secured to the dashboard of the vehicle in the interior thereof, an operating lever turnably mounted on said bracket, means on the lever adapted to cooperate with means on the bracket so as to fix the lever in adjusted positions, and a Bowden cable for connecting said pulley and lever.

In testimony whereof I affix my signature.

WILLIAM RICH MacKENZIE.